United States Patent [19]
Eakin et al.

[11] Patent Number: 5,924,922
[45] Date of Patent: Jul. 20, 1999

[54] METHOD AND APPARATUS FOR CEILING VENTILATION

[75] Inventors: George R. Eakin; Ronald M. Thibault, both of Osborne, Kans.

[73] Assignee: Osborne Industries, Inc., Osborne, Kans.

[21] Appl. No.: 08/749,813

[22] Filed: Nov. 15, 1996

Related U.S. Application Data

[63] Continuation of application No. 08/485,726, Jun. 7, 1995, abandoned

[51] Int. Cl.$^6$ .................................................. F24F 13/10
[52] U.S. Cl. ........................... 454/256; 454/259; 454/302; 454/304; 454/270
[58] Field of Search ................................... 454/253, 255, 454/256, 259, 270, 275, 302, 303, 304, 305, 323, 334

[56] References Cited

U.S. PATENT DOCUMENTS

| | | |
|---|---|---|
| D. 257,060 | 9/1980 | Mann . |
| 3,103,869 | 9/1963 | Dry .......................................... 454/302 |
| 3,601,096 | 8/1971 | Rutherford ........................... 454/253 X |
| 4,182,227 | 1/1980 | Roy .......................................... 454/302 |
| 4,535,685 | 8/1985 | Reuter . |
| 4,794,852 | 1/1989 | Ee . |
| 5,236,391 | 8/1993 | Schaefer .............................. 454/270 X |

FOREIGN PATENT DOCUMENTS

| | | |
|---|---|---|
| 63630 | 3/1983 | Finland . |
| 21 05 077 | 8/1972 | Germany . |
| 60-155846 | 8/1986 | Japan ....................................... 454/255 |
| 84/01615 | 4/1984 | WIPO ...................................... 454/302 |

OTHER PUBLICATIONS

"Air Mix & Recirculation", Brochure, The Better Air System with various models pictured.
Brochure on Schaefer "Automatic Fresh–Air Hallway Intake" with various models pictured, pp. 11–15.
Brochure on RAYDOT ventilation systems with various models pictured, pp. 3–5.

*Primary Examiner*—Harold Joyce
*Attorney, Agent, or Firm*—Zarley, McKee, Thomte, Voorhees & Sease

[57] ABSTRACT

A ceiling ventilation inlet includes a housing having an air inlet aperture, an air outlet aperture, and a baffle supported for linear movement adjacent the air outlet aperture. A spring is positioned such that the baffle moves dependant upon air pressure difference between the confinement space and the external environment. Air entering the housing opens the baffle and enters the livestock confinement building in a 360 degree dispersion pattern. The spring causes the baffle to direct the flow of air into the confinement space at a near constant rate so as to optimize ventilation. The greater the air pressure difference between the confinement space and the external environment the greater the air outlet area becomes. Since the inlet is responsive to the pressure difference and the air outlet area increases or decreases in size, the airflow velocity entering the confinement space may be optimized at a near constant rate. Mathematical equations and limiting parameters define the relationship between the geometrical design of the ceiling ventilation inlet and the optimum and acceptable range of properties for the spring.

24 Claims, 5 Drawing Sheets

5,924,922

METHOD AND APPARATUS FOR CEILING VENTILATION

This is a continuation of application Ser. No. 08/485,726 filed on Jun. 7, 1995 abandoned.

BACKGROUND OF THE INVENTION

This invention relates to a method and means for improving mechanical ventilation for livestock confinement buildings.

A good ventilation system for livestock confinement buildings is essential for the health, well-being, and development of the confined animals. The ventilation system accomplishes the following three tasks: air exchange between the interior of the building and the exterior environment to replenish oxygen and to remove moisture, waste gases and dust, air circulation within the building to produce an evenly tempered, uniform living environment for the animals, and heating or cooling to maintain the temperature within a chosen optimum range for the animals.

Two alternative types of ventilation systems are generally used to provide ventilation for animals, either natural ventilation systems or mechanical ventilation systems.

Natural ventilation systems rely upon the wind passing through openings, such as windows or continuous openings along the sides of the building, and upon thermal currents created by the natural buoyancy of heated air within the building. Fresh air therefore enters the building and circulates through the confinement space and then exits on the down-wind side of the building and through vents in the ridge or other high point in the roof, removing moisture, waste gases, and dust with the exiting air stream. Although natural ventilation may be less costly to construct and to operate, ventilation reliability is unpredictable because its operation is greatly dependent upon the forces of nature, over which the system generally has only minimum control.

Mechanical ventilation systems use powered exhaust fans to slightly reduce the air pressure within the building and thereby causing fresh air to be drawn into the space to be ventilated while the fans discharge the moisture, gases, and dust from the building. The incoming fresh air is conveyed into the building through specific air inlet locations. The air inlet locations are chosen by one skilled in the art of ventilation according to specific engineering practice so that these locations cooperate in developing good fresh air distribution throughout the building.

The air inlet locations are generally equipped with devices called air inlets that attempt to regulate the volume flow of fresh air, its incoming speed, and its direction into the building. The air inlet regulates the volume flow of the fresh air to balance the fresh air requirement of the animals with the need to conserve or expel heat from within the building and to proportionately match the variable exhaust capacity of the exhaust fans. The air inlet controls the speed of the incoming air to regulate the distance that the air stream penetrates into the ventilated space and the circulation pattern that results within that space. The air inlet also directs the incoming air into the building. In the wintertime the goal is to maximize mixing time for the incoming cold air with the warm interior air and therefore avoid stressful drafts. In summertime the goal is to optimize the cooling effect of the incoming fresh air on the animals.

Mechanical ventilation systems use a wide variety of means and methods for air inlets including both automatic self-regulating air inlets that respond only to the slight vacuum created by the exhaust fans and also manually set and power-driven air inlets with regulation devices which sense the operation of the exhaust fans or the vacuum that they create. Automatic self-regulating air inlets are generally preferred over manually set air inlets because the latter require continuous supervision labor and are preferred over power-driven air inlets because the latter are more costly, complicated, and less reliable in operation.

Automatic self-regulating air inlets may be designed specifically for use in the ceiling, on the sidewall, or with slots in the juncture between the ceiling and sidewall of the building.

The proper operation of automatic air inlets is generally effected by wind pressure. This wind pressure, by its very nature, is variable and unpredictable. Its effect on the performance of air inlets and, by extension, the ventilation system can be seriously detrimental to achieving the goals of the ventilation system.

This invention relates to specific methods and means that define the design and construction of an improved automatic self-regulating air inlet device which minimizes the effect of wind pressure on air inlet performance and which is positioned in the ceiling joists, between the roof and the confinement space, of confinement buildings.

SUMMARY OF THE INVENTION

Therefore, a primary objective of the present invention is the provision of an improved method and means for ventilating a livestock confinement building.

A further objective of the present invention is the provision of an improved method and means for ventilation which accurately and proportionately controls the volume of the incoming air stream.

A further objective of the present invention is the provision of an improved method and means for ventilation which accurately controls the speed of the incoming air stream to maximize its mixing time and tempering effect with the warmer interior air when the incoming air stream is cold in winter, to optimize its cooling effect in summertime, and to provide a smooth automatic transition between these two operating extremes.

A further objective of the present invention is the provision of an improved method and means for ventilation which accurately controls the direction of the incoming air stream so that the direction is generally along the ceiling. When the volume of incoming air is reduced in wintertime, a near constant velocity will promote mixing and tempering of the colder incoming air with the warmer air higher in the room. When the volume of air is increased in summertime, a near constant velocity promotes cooling of the animals by more immediate contact and a greater volume of circulating air.

A further objective of the present invention is the provision of an improved method and means for ventilation which minimizes the effect on air inlet performance of exterior wind pressure on the air inlet.

A further objective of the present invention is the provision of an improved method and means for ventilation which is totally automatic in operation without the need for manual or power-assisted supervision or adjustment.

A still further objective of the present invention is the provision of an improved method and means for ventilation of a livestock confinement building in order to provide optimum air distribution which minimizes stagnate air spaces and localized drafts while providing optimum air exchange within the confinement living space.

Another objective of the present invention is the provision of an improved method and means for ventilation within a livestock confinement building which is economical, efficient in use, automatic in operation, and which results in a desirable and durable assembly.

The present invention utilizes a ceiling inlet having a cylindrical inlet sidewall including an inlet aperture and an outlet aperture, and a flange located adjacent the outlet aperture. Mounted adjacent the outlet aperture is a baffle. This baffle is connected for piston-like movement and can move between a first closed position wherein no air is allowed to enter the livestock confinement space and a second open position wherein air flows into the livestock confinement space. The baffle is also hinged so that a first and second baffle portions can fold down for substantially undirected and uninterrupted airflow into the confinement space.

In order to ensure the movement of the baffle is constant and linear respective to the inlet housing, the baffle shaft is supported for linear movement by a guide tube which is connected to the cylindrical sidewall. The upper end of the baffle shaft is connected to a cantilever bar. The cantilever bar is also connected to a biasing means spring, while the bar itself is supported for pivotal movement. The biasing means spring, through its mechanical connection to the baffle shaft, exerts a force on the baffle which tends to hold the baffle in a closed position until air pressure difference between the confinement space and the external environment is sufficient to move the baffle toward its second, or open, position.

Due to the positioning of the baffle adjacent the outlet area of the cylindrical inlet housing, the baffle also acts as a directional member forcing incoming air into a flow direction along the ceiling of the confinement space. Due to the invention's unique construction, regardless of airflow velocity, the baffle imparts substantially the same influence on the direction of the air flow. However, as the volumetric rate of air flow changes, the baffle will adjust and tend to force the air flow velocity towards a consistent predetermined rate in the confinement space in order to project the fresh air further into the confinement space and into the air mass above the animals that contains the highest heat and moisture content.

DETAILED DESCRIPTION OF THE PREFERRED EMBODIMENT

Figure 1:
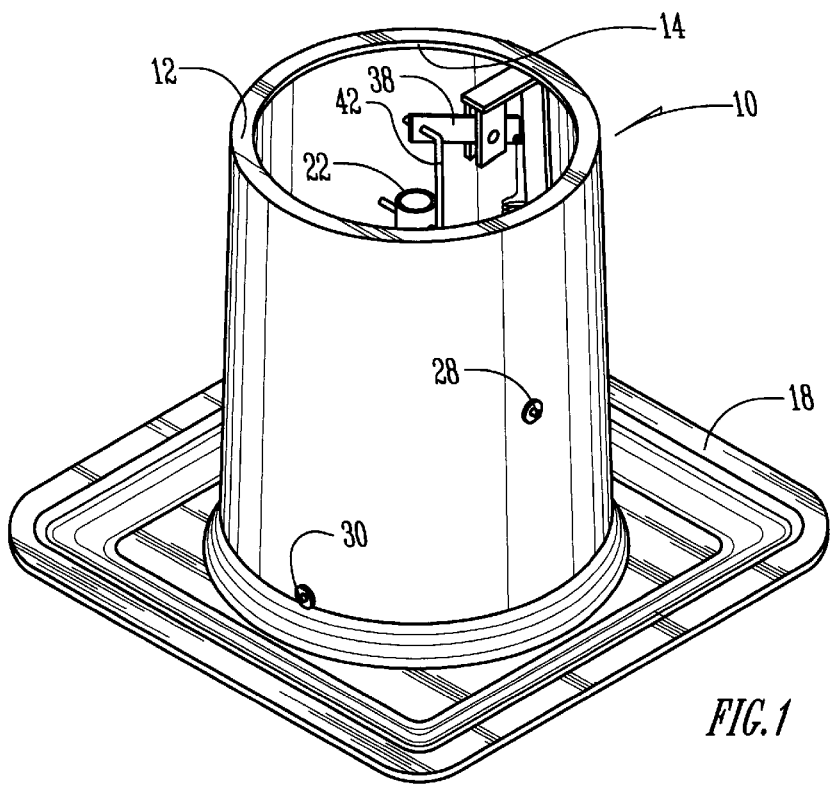
FIG. 1 is a perspective view of a ceiling ventilation inlet.

Referring to the drawings, numeral 10 generally refers to a ceiling ventilation inlet of the present invention which comprises a cylindrical sidewall 12 having an air inlet aperture 14 and an air outlet aperture 16. A flange 18 is formed integrally with the air outlet aperture 16 of the ceiling inlet 10. Flange 18 is designed to engage the ceiling of a livestock confinement space.

Figure 2:
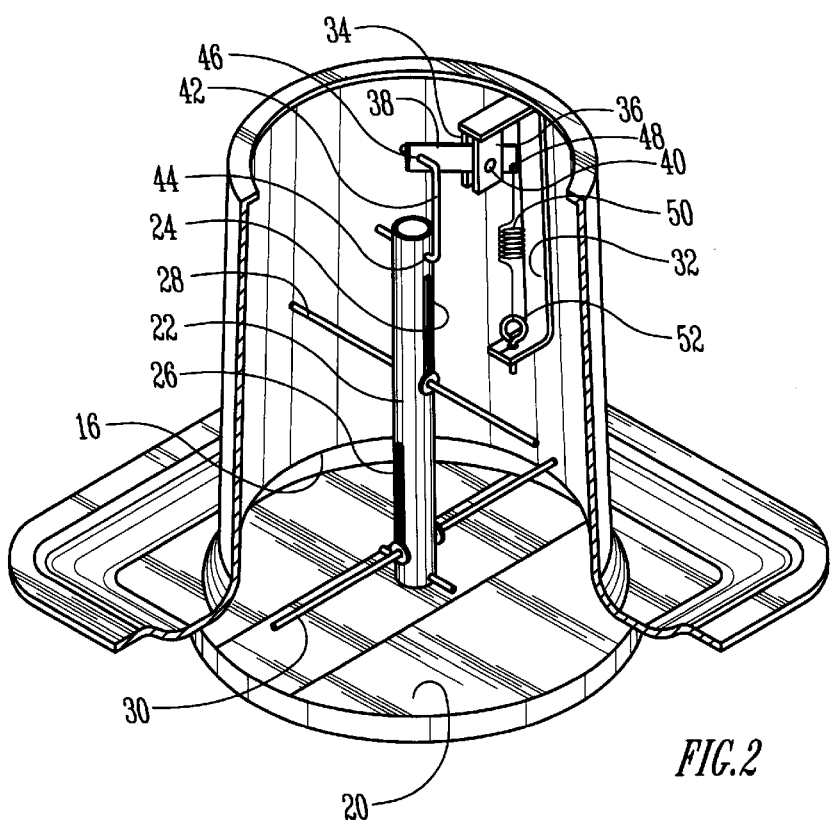
FIG. 2 is a perspective cutaway view of FIG. 1.

As best shown in the cut-away view of FIG. 2, a baffle 20 of approximately the same size and shape of the air outlet aperture 16 is positioned adjacent thereto. Baffle 20 is connected to baffle shaft 22, a hollow cylindrical tube which is supported for linear movement in a generally vertical orientation. Baffle shaft 22 includes an upper guide channel 24 and a lower guide channel 26 cut at different heights in the longitudinal dimension of baffle shaft 22. Upper guide rod 28 extends through upper guide channel 24 and is fixed at both ends to the cylindrical sidewall 12. Lower guide rod 30 extends through lower guide channel 26 and also is coupled at both ends to the cylindrical sidewall 12. Because the upper and lower guide channels 24, 26 are not colinear along the longitudinal dimension of baffle shaft 22, the use of the upper and lower guide rods 28, 30 prevents all but vertical movement of baffle shaft 22 relative to ceiling inlet 10.

Cantilever bracket 32 is attached to cylindrical sidewall 12 and is generally C-shaped with the center portion of the "C" being fitted against sidewall 12. Extending downwardly from the upper portion of the C-shaped bracket 32 is the first and second pivot plates 34, 36. First and second pivot plates 34, 36 are spaced apart so that cantilever bar 38 can be positioned therebetween. Pivot pin 40 extends from the first pivot plate 34 to the second pivot plate 36 through an aperture (not shown) in cantilever bar 38. Cantilever bar 38 then pivots about pivot pin 40.

Connector pin 42 connects baffle shaft 22 to the cantilever bar 38. Connector pin 42 is hooked into baffle shaft 22 at baffle connection point 44. Connector pin 42 is attached to cantilever bar 38 at cantilever connection point 46.

At the opposite end of cantilever bar 38, the biasing means connector point 48 is shown. Biasing means 50 is connected at biasing means connector point 48 of the cantilever bar 38 and extends to eyebolt 52. Eyebolt 52 is connected to the lower portion of bracket 32.

Figure 3:
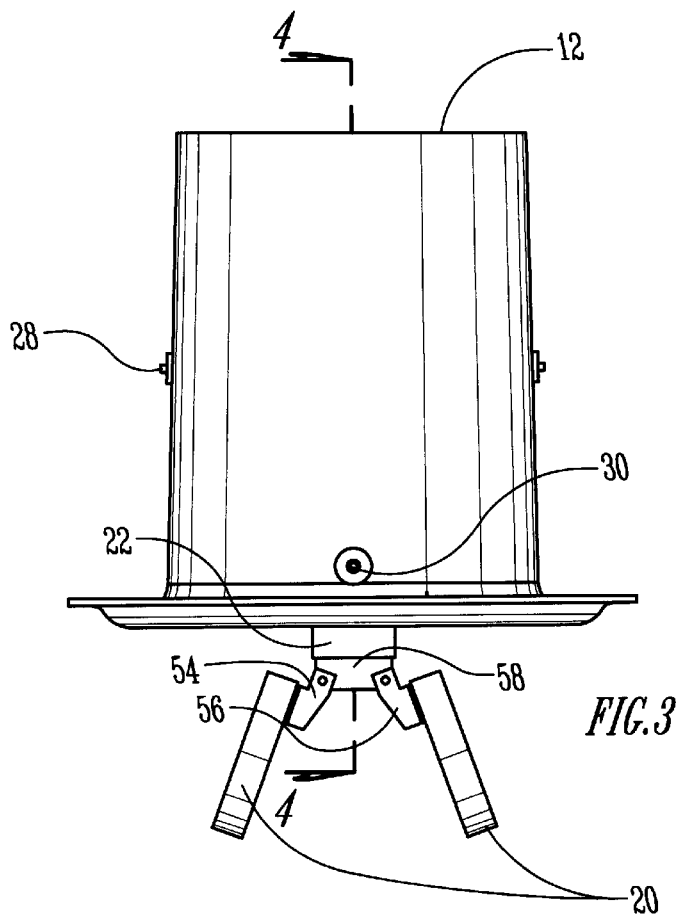
FIG. 3 is an elevational view of a ceiling ventilation inlet with baffle sections hinged open.

Additionally, baffle 20 can be manually opened to allow constant air flow without change of direction or velocity. Baffle 20 includes hinges 54, 56 which are connected to hinge plate 58. By opening the baffle 20 as shown in FIG. 3, fresh air can be injected into the confinement space without the effect of the direction and velocity control of the present invention.

Figure 7:
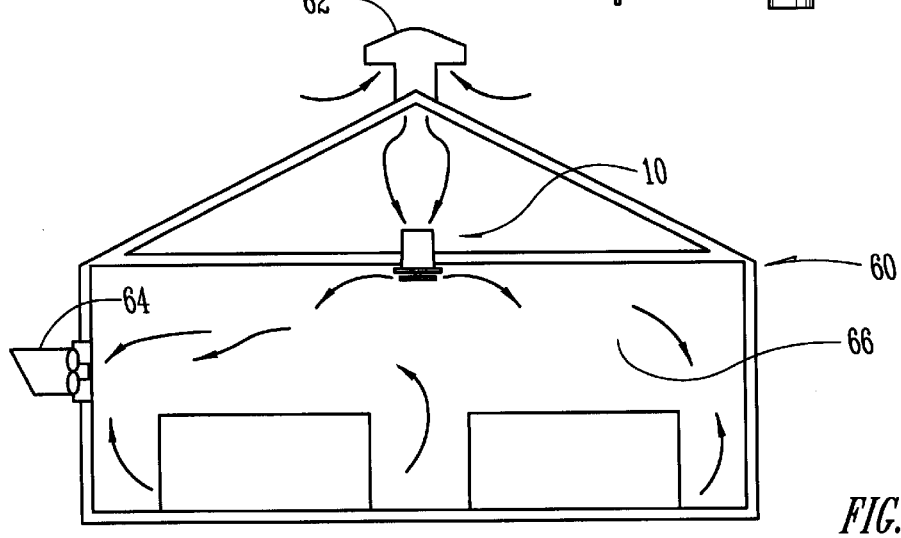
FIG. 7 is a sectional view showing an overall ventilation system and its effect in a livestock confinement building.

The general operation of the ceiling inlet 10 is best shown in FIG. 7. Livestock confinement building 60 is shown having an exterior air inlet 62. When the air pressure within the livestock confinement building 60 is less than the air pressure externally, air is drawn into the exterior air inlet 62 and subsequently through the ceiling inlet 10 as shown by the arrows in FIG. 7. This difference in air pressure is achieved, as stated earlier, by either natural methods or mechanical systems such as the power exhaust fan 64. Once air is drawn into the ceiling inlet 10 and its housing 12 the air pressure difference should be sufficient to cause the baffle 20 to move towards an open position and allow air to escape from the area created between the air outlet aperture 16 and baffle 20. The size of this air outlet area will depend on the distance from baffle 22 to the air outlet aperture 16. Because the air outlet area extends 360 degrees around the ceiling inlet, ventilation in each and every direction is enhanced and air exiting the housing 12 travels in a 360 degree pattern of dispersion.

Figure 4:
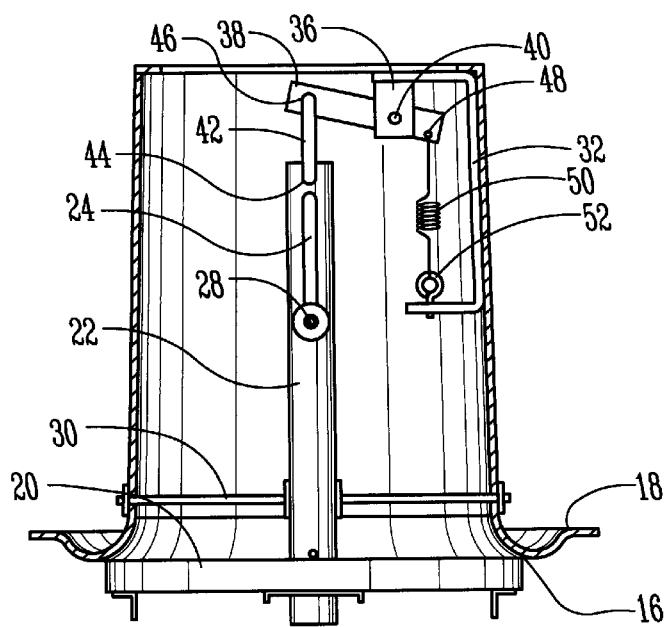
FIG. 4 is a sectional view taken along line 4—4 of FIG. 3 with the baffle in a closed position.
Figure 5:
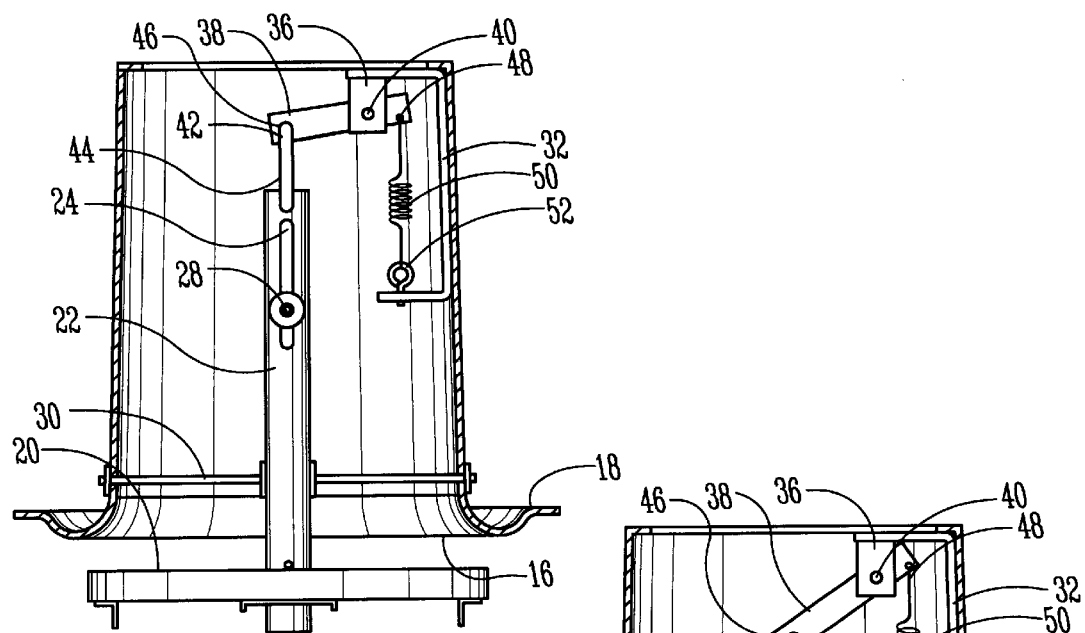
FIG. 5 is a sectional view with the baffle shown in a slightly open position.
Figure 6:
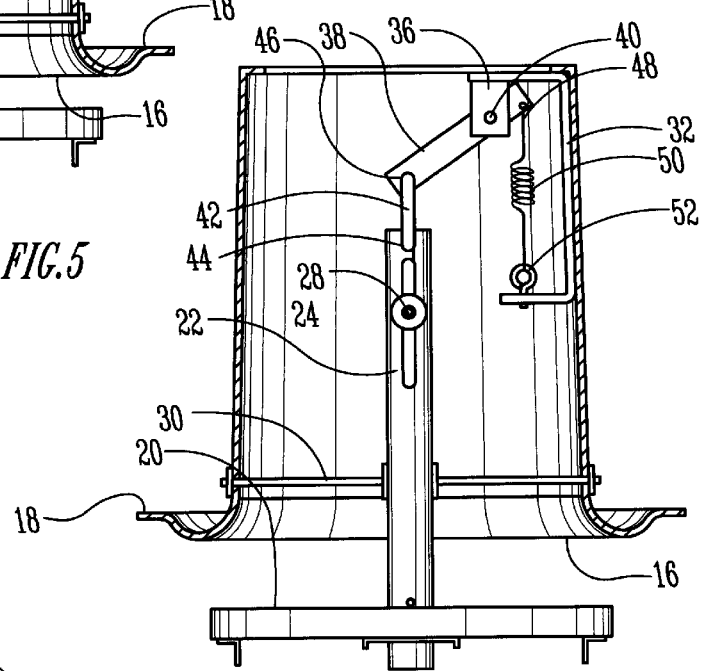
FIG. 6 is a sectional view with the baffle shown in the open position.

In operation, and specifically referring to FIGS. 4 through 6, the ceiling inlet 10 of the present invention accomplishes at least all of its stated objectives by constantly altering the size of the air outlet area to compensate for a lower or higher fresh air volumetric flow rate into the confinement building.

FIG. 4 shows baffle 20 in a closed position, covering air outlet aperture 16 and resting against flange 18. The structure shown in FIG. 4 will exist typically when the air pressure inside the housing sidewall 12 is lower than or substantially equal to the air pressure inside the livestock confinement space 66. Should the air pressure within the cylindrical sidewall 12 rise to a level where it is greater than the air pressure in the livestock confinement space 66, the resulting pressure will force baffle 20 and baffle shaft 22 to move in a linear fashion downwardly thereby creating an air outlet area. This situation is shown in FIGS. 5 and 6. The air outlet area in FIG. 5, shown best as the area between flange 18 and baffle 20, will increase (to that size shown in FIG. 6) should the air pressure within the housing 12 increase.

In general, however, in order to optimize ventilation and decrease unnecessary drafts, a flow velocity of approximately 1000 feet/min. of air entering the livestock confinement space 66 is desired. In order to achieve a near constant flow velocity without manual adjustments, it is important that baffle 20 move up and down between its open and closed position to compensate for different air pressures within the cylindrical sidewall 12. Therefore, as shown in FIG. 5, air pressure in the housing is just slightly higher than the pressure in the confinement space 66, the baffle will move slightly downward and provide a minimal air outlet area thereby forcing the fresh air entering the confinement space 66 to travel at the desired velocity into the confinement space 66. However, should the air pressure within cylindrical sidewall 12 be relatively high, baffle 20 will move even more downwardly to an open position so as to compensate for the higher air pressure difference and allow more air to escape at the same or similar velocity. Again, while a velocity in the range of 500 to 1600 feet/min. is appropriate, it is believed the optimum air velocity rate is approximately 1000 feet/min.

Figure 10:
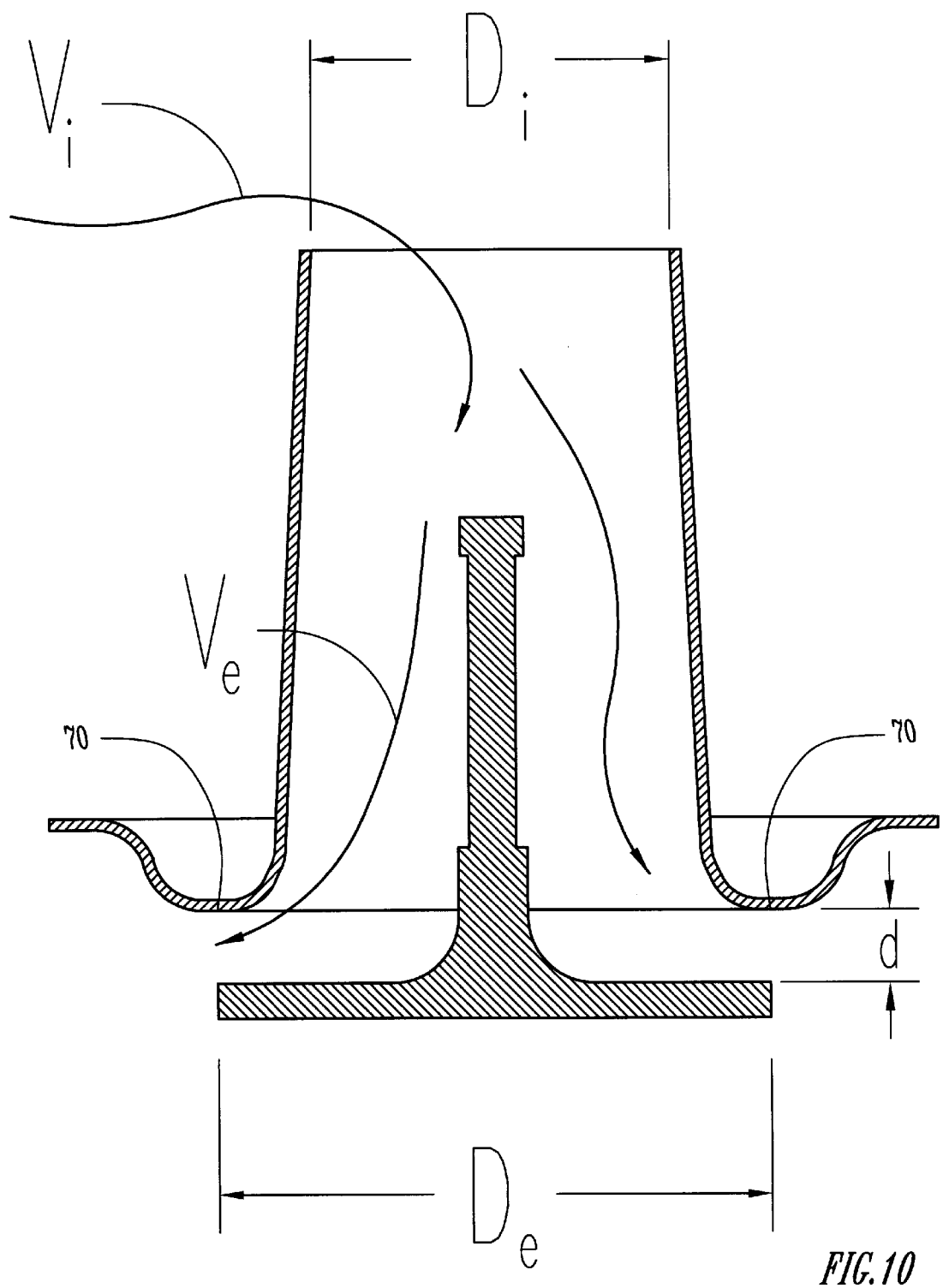
FIG. 10 is a sectional view defining certain dimensions of a preferred embodiment.

The balance force needed to resist the flow force acting on the baffle can be determined by using standard flow equations accepted by those skilled in the art of ventilation. The parameters used in the equations are shown in FIG. 10 and listed in Table 1.

TABLE 1

| PARAMETER | DESCRIPTION |
|---|---|
| $V_i$ | Air Inlet Velocity |
| $V_e$ | Air Exit Velocity |
| $D_i$ | Inlet Opening Diameter |
| $D_e$ | Exit Opening Diameter |
| d | Baffle Deflection |
| $\rho a$ | Standard Air Density |

The flow force on the baffle is equivalent to the velocity pressure acting on the projected baffle area. The velocity pressure, $V_p$, is calculated using the equation below.

$$V_p = \tfrac{1}{2} * \rho_a * V^2$$

The velocity, V, used in the above equation is the desired exit air velocity from the intake. The recommended exit air velocity for ventilation intakes is in the range of 500 to 1600 feet per minute (fpm). If the exit air velocity is below 500 fpm, the resultant mixing of fresh air and confinement building air is insufficient for good ventilation. If the exit air velocity is above 1600 fpm, the pressure difference between the interior building space and the exterior environment space is greater than the pressure difference created by the ventilation fans. The result of this latter condition is inadequate air supply for the animals in the confinement space.

A proportionality constant, $K_c$, is defined as the difference in forces between the open, $F_o$, and closed, $F_c$, baffle locations divided by the deflection, d, (or downward distance) of the baffle.

$$K_c = (F_o - F_c)/(d_o - d_c)$$

The flow force proportionately enlarges the baffle deflection until the exit opening area equals the inlet opening area. When this latter condition exists, the baffle is at its maximum open distance and the inlet opening area, not the baffle, regulates the volumetric amount of air entering the confinement space. As the inlet opening area increasingly controls the volumetric air flow, the rate of increase of the pressure force on the baffle is proportionately reduced and becomes a function of the inlet area.

As defined in FIG. 10, the maximum baffle deflection, $d_{max}$, is determined to be:

$$d_{max} = (D_i)^2/(4*D_e)$$

If the exit air velocity is maintained absolutely constant, the proportionality constant must be zero. If a designed relationship between exit air velocity and baffle deflection is chosen, the proportionality constant is calculated using the equation below.

$$K_c = \tfrac{1}{2}\rho_a\, \pi(D_e^3/D_i^2)(V_{max}^2 - V_{min}^2)$$

where:

$V_{min}$=Exit Air Velocity when baffle begins to open $V_{max}$=Exit Air Velocity when baffle is at desired opening (d) and;

$V_{min}$ and $V_{max}$ range between 500 fpm (100 in/s) and 1600 fpm (320 in/s)

d ranges from 0 to $d_{max}$

The design objective of the present invention using the foregoing design equations and concepts with a defined exit air velocity range is an inlet that functions automatically throughout the entire operating year. The minimum exit air velocity occurs during the winter season when volumetric air requirements are reduced owing to lower pressure differences between the interior confinement space and the exterior environment. At these low volumetric wintertime requirements, if the intake design operates to develop high pressure differences, unplanned air infiltration into the building through cracks and other openings causes undesirable drafts and improper fresh air distribution.

For summer ventilation, a maximum exit air velocity is chosen to develop the maximum volume of airflow to the confinement space at an acceptable pressure difference. The goal for this choice is optimum ventilation efficiency.

If the values below are used in determining the proportionality constant $K_c$, the range can be shown to be:

$$0 < K_c < 166.154 \times 10^{-3} * (D_e)^3/(D_i)^2$$

where:

$\rho_a = 1.113 \times 10^{-7}$ lb$_f$*s$^2$/in$^4$ $V_{min} = 100$ in/s (500 fpm)

$V_{max} = 320$ in/s (1600 fpm)

The value of the calculated proportionality constant, $K_c$, is used to determine the means and method necessary to automatically counteract the flow force which acts on the baffle.

In order to calculate the necessary proportionality constant for spring 50 in the preferred embodiment, and allow for a constant velocity, the following formula has been derived:

$$K_A = (X_C/X_A)^{2} * K_C$$

wherein:

$F_A$ = force at point A to counter force at point C
$F_C$ = force of baffle on cantilever
$K_C$ = proportionality constant of optimum design
$K_A$ = proportionality constant required at point A to produce proportionality constant at point C
$X_A$ = distance from pivot point to point A
$X_C$ = distance from pivot point to point C This formula would apply to both center pivot points and end pivot points on the cantilever bar 38. The proportionality constant, $K_C$, of the optimum design is determined using the equations previously defined. If the minimum exit air velocity is 170 in/s and the maximum exit air velocity is 290 in/s then $K_c = 9.65 \times 10^{-3} * (D_e^3/D_i^2)$.

Figure 8:
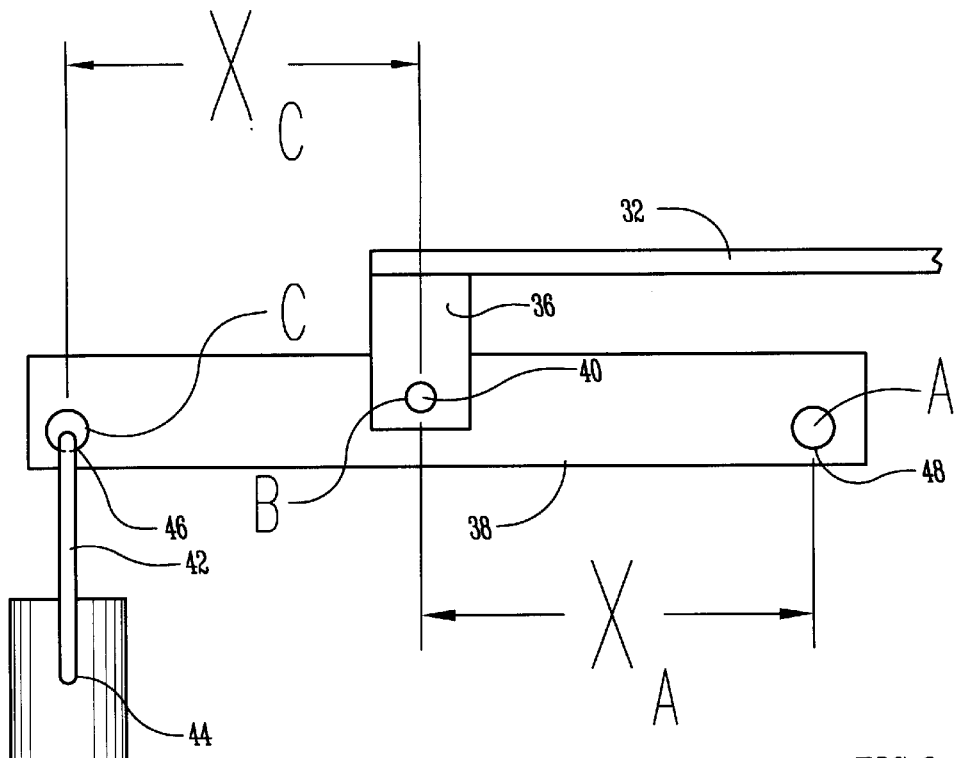
FIG. 8 is an isolated view of the cantilever mechanism defining relative dimensions used in describing the present invention.

After the optimum proportionality constant and the geometrically determined constants have been calculated for a proposed geometry as defined by FIG. 8, the design specification for the ceiling inlet is established.

Figure 9:
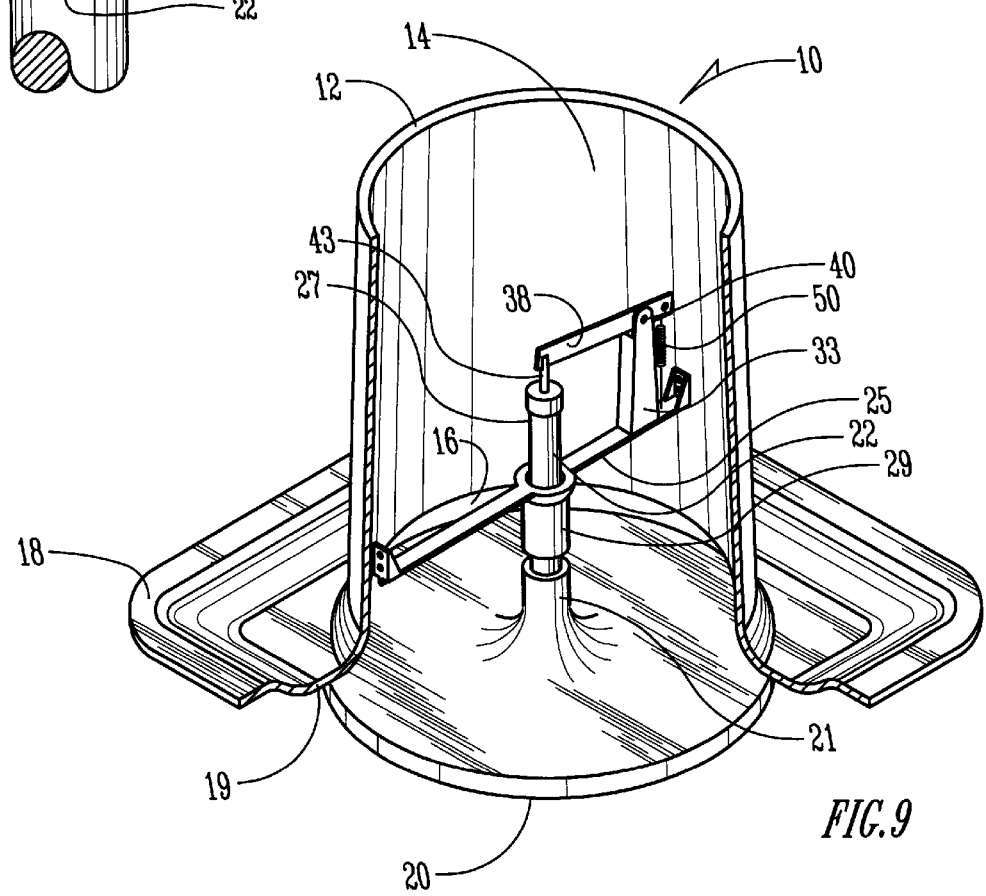
FIG. 9 is a perspective cutaway view of an alternative embodiment of the present invention.

An alternative design of the preferred embodiment is shown in FIG. 9. As in the earlier described design, the inlet 10 has a cylindrical sidewall 12 having an air inlet aperture 14 and an air outlet aperture 16. A flange 18 extends from outlet aperture 16. Finally, baffle 20 is supported for piston-like movement by its connection to baffle shaft 22. In this design, the up and down motion of baffle 20 is regulated by the guide assembly bracket 25 having an aperture 27 through which shaft 22 extends. Bracket 25 permits baffle shaft 22 to move longitudinally. However, lateral movement of shaft 22, and therefore baffle 20, is curtailed. This is enhanced by collar 29 which is attached to bracket 25.

Further, the cantilever bracket 32 of the earlier embodiment is eliminated. Cantilever bar 38 is supported for pivotal movement by the cantilever support 33 so that bar 38 pivots about point 40. One end of bar 38 is connected to the biasing means 50. In this embodiment, biasing means 50 is connected to bracket 25. The other end of bar 38 is connected to connecting rod 43 which, in turn, is connected to shaft 22.

Finally, this embodiment utilizes well-known principles of aerodynamics. Baffle 20 has a parabolic neck 21 which provides for a smooth transition between baffle 20 and shaft 22. Further, the flange 18 has a curved lip 19 which has a radius of curvature of approximately one-tenth the diameter or width of air outlet 16. Baffle 20 contacts the lip at tangential point 70.

In the preferred embodiment, the structure may be constructed of a variety of materials. For example, the entire structure can be manufactured from wood, insulated metal, fiberglass-reinforced plastic, or from a variety of alternative plastic materials. The materials of the present invention can be varied without detracting from the spirit or the intent thereof. The ceiling inlet can quickly and easily be installed in a livestock confinement building and therefore meets all of its stated objectives.

In addition to those structures shown in the drawings, other structures or materials may be utilized without detracting from the invention. For example, while the use of a spring cantilever supplies the necessary biasing force for the baffle 20 in the preferred embodiment, other means exist for accomplishing the same function. Other such structures could include a constant force spring, a counterweight and pulley system, a simple spring utilized without a cantilever arm, a flexible rod or torsion spring, a lighter duty spring used in combination with a counterbalanced and pivot cantilever bar, and a cam type operator and counterweight system. Each of these devices could be adapted and arranged to provide the necessary force on the baffle 20.

In the drawings and specification, there has been set forth a preferred embodiment of the invention, and although specific terms are employed, they are used in a generic and descriptive sense only and not for purposes of limitation. Changes in the form and the proportional parts as well as in the substitution of equivalents are contemplated as circumstances may suggest or render expedient without departing from the spirit or scope of the invention, as further defined in the following claims.

What is claimed:

1. A ventilation inlet for a livestock confinement building, comprising:

a housing having an air inlet aperture and an air outlet aperture;

a baffle located adjacent the air outlet aperture, the baffle being supported for movement between a closed position and an open position; and biasing means connected to said baffle, the biasing means having a sufficient spring constant and positioned such that air flow exiting the air outlet has a velocity which is automatically maintained substantially in the range of one hundred inches per second to three hundred and twenty inches per second.

2. The ventilation inlet of claim 1 wherein the housing is cylindrical.

3. The ventilation inlet of claim 1 further comprising a flange formed integrally with the air outlet aperture.

4. The ventilation inlet of claim 1 wherein the outlet aperture is formed with a smooth transitional radius.

5. The ventilation inlet of claim 3 wherein the flange extends outwardly from the air outlet aperture.

6. The ventilation inlet of claim 3 wherein the baffle contacts the flange when the baffle is in the closed position.

7. The ventilation inlet of claim 1 wherein the baffle includes a hinged portion supported for movement between a first position, whereby the baffle substantially covers the air outlet aperture, and a second position, whereby airflow is substantially unrestricted by the baffle.

8. The ventilation inlet of claim 1 wherein the baffle includes a baffle shaft having one end connected to the biasing means.

9. The ventilation inlet of claim 1 wherein the baffle includes a parabolic center to promote laminar air directional change within housing.

10. The ventilation inlet of claim 8 further comprising means for limiting movement of the baffle shaft to a substantially linear path.

11. The ventilation inlet of claim 10 wherein the means for limiting movement is positioned substantially normal to the shaft.

12. The ventilation inlet of claim 1 wherein the biasing means is selected after specifying air inlet velocity, air exit velocity, inlet opening diameter, exit opening diameter, baffle deflection, and standard air density, and after selection of minimum and maximum exit air velocities desired.

13. A ventilation inlet for a livestock confinement building, comprising:

a housing having an air inlet aperture and an air outlet aperture;

an air regulating means including a baffle having sufficient size and shape to cover the air outlet and a baffle shaft connected to the baffle supported for linear movement in a substantially vertical direction, the air regulating means capable of movement between an open position and a closed position;

biasing means for providing force to the air regulating means in a direction which would move the air regulating means toward the closed position, the biasing means including a bracket connected to the housing, a cantilever bar supported for pivotal movement about a pivot point by the bracket, a spring connected at one end to the cantilever bar and at the other end to the housing, and a baffle connector connected at one portion to the baffle shaft and at another portion to the cantilever bar.

14. The ventilation inlet of claim 13 wherein the baffle moves from the closed position to the open position responsive to air pressure within the housing such that air flow exiting the housing is maintained at a speed in the range of approximately 500 to 1600 feet/min.

15. The ventilation inlet of claim 14 wherein the spring has a proportionality constant sufficient to maintain the airflow speed exiting the air outlet aperture at approximately 1000 feet/min.

16. A ventilation inlet for a livestock confinement building, comprising:

a housing having an air inlet aperture and an air outlet aperture;

a baffle located adjacent the air outlet aperture, the baffle being supported for movement between a closed position and an open position;

biasing means connected to said baffle for providing force on the baffle in a direction to move the baffle from the open position to the closed position, the biasing means comprising a bracket connected to the housing, a member connected to the bracket and supported for pivotal movement about a pivot point, the member also being connected to the baffle, and a spring connected at one end to one of the housing and bracket and at another end to the member.

17. The ventilation inlet of claim 16 wherein the pivot point for the member is at a prescribed position for correct mechanical advantage between a first connection point located where the member is coupled to the baffle and a second connection point located where the member is coupled to the spring.

18. The ventilation inlet of claim 16 wherein the pivot point for the member is at the location of connection of the member to the bracket and the spring is connected to the member at a prescribed position for correct mechanical advantage between the pivot point and where the member is coupled to the baffle.

19. The ventilation inlet of claim 17 wherein the member is a lever arm.

20. The ventilation inlet of claim 18 wherein the member is a cantilever arm.

21. A method for optimizing a ventilation inlet for use in a livestock confinement building having a housing with an air inlet and an air outlet and a baffle located adjacent the air outlet, the baffle being supported for movement between a closed position and an open position, the method comprising the steps of:

determining air inlet diameter, $D_i$;

determining air outlet diameter, $D_e$;

determining standard air density, $\rho_a$;

determining force on the baffle in the closed position, $F_C$;

determining force on the baffle in the open position, $F_o$;

determining deflection of the baffle in the closed position, $d_C$;

determining deflection of the baffle in the open position, $d_o$;

selecting a desired minimum and maximum exit air velocity, $V_{min}$ and $V_{max}$;

selecting a biasing means for attachment to the baffle based on the values determined in previous steps, the biasing means selected and positioned such that a proportionality constant, $K_C$, defined by the equation $(F_o-F_C)/d_o-d_C)$, remains substantially in a range between 0 and $\frac{1}{2} \rho_a \pi (D_e^3/D_i^2) (V_{max}^2-V_{min}^2)$ so that air exiting the air outlet will have an automatically maintained velocity substantially in a range between the minimum selected exit air velocity, $V_{min}$, to the maximum selected exit air velocity, $V_{max}$.

22. The method for optimixing a ventilation inlet of claim 21 maximum baffle deflection, $d_{max}$, is determined by the equation $d_{max}=(D_i^2)/(4*D_e)$.

23. The method of optimizing a ventilation inlet of claim 21 further comprising the step of determining the proportionality constant at point A, $K_A$, by using the equation $$K_A=(X_C/X_A)^2 * K_C$$

wherein $X_A$ represents distance between a pivot point and point A, and $X_C$ represents distance between the pivot point and point C.

24. The method for optimizing a ventilation inlet of claim 21 wherein $V_{min}$ is 500 feet per minute or more and $V_{max}$ is 1600 feet per minute or less.

* * * * *